US006865800B2

(12) United States Patent
Utecht et al.

(10) Patent No.: US 6,865,800 B2
(45) Date of Patent: Mar. 15, 2005

(54) PRODUCTION OF LAMINATED VENEER SUPPORT BEAMS

(75) Inventors: Martin J. Utecht, Corvallis, OR (US); Michael S. Dahrens, Albany, OR (US); Jason A. Holbert, Corvallis, OR (US); John C. Holbert, Brinnon, WA (US)

(73) Assignee: Corvallis Tool Co., Philomath, OR (US)

(*) Notice: Subject to any disclaimer, the term of this patent is extended or adjusted under 35 U.S.C. 154(b) by 22 days.

(21) Appl. No.: 10/354,617

(22) Filed: Jan. 29, 2003

(65) Prior Publication Data

US 2004/0143960 A1 Jul. 29, 2004

(51) Int. Cl.[7] .................................................. B23P 21/00

(52) U.S. Cl. ............................. 29/711; 29/712; 29/771; 29/779; 29/783; 29/791; 29/822; 29/33 P; 29/33 Q

(58) Field of Search ........................... 29/711, 700, 712, 29/771, 779, 783, 786, 791, 793, 794, 819, 822, 33 K, 33 P, 33 Q, 33 S

(56) References Cited

U.S. PATENT DOCUMENTS

| | | | | | |
|---|---|---|---|---|---|
| 3,723,227 | A | * | 3/1973 | Oono et al. | 156/557 |
| 3,928,114 | A | * | 12/1975 | Aylon | 156/351 |
| 4,288,274 | A | * | 9/1981 | Holz | 156/364 |
| 4,722,653 | A | * | 2/1988 | Williams et al. | 414/222.13 |
| 4,797,169 | A | * | 1/1989 | Aizawa et al. | 156/64 |
| 4,856,701 | A | * | 8/1989 | Pockl | 228/6.1 |
| 4,931,113 | A | * | 6/1990 | Feichtmeir et al. | 156/64 |
| 4,934,228 | A | * | 6/1990 | Bolton et al. | 83/23 |
| 5,271,139 | A | * | 12/1993 | Sticht | 29/430 |
| 5,948,188 | A | * | 9/1999 | Gibson et al. | 156/64 |
| 5,992,281 | A | * | 11/1999 | Holbert | 83/176 |
| 6,047,622 | A | * | 4/2000 | Tracy et al. | 83/176 |
| 6,280,560 | B1 | * | 8/2001 | Graf | 156/299 |
| 6,402,877 | B1 | * | 6/2002 | Bielfeldt | 156/264 |
| 6,444,079 | B1 | * | 9/2002 | Bielfeldt | 156/266 |

* cited by examiner

*Primary Examiner*—Essama Omgba
(74) *Attorney, Agent, or Firm*—Schwabe, Williamson & Wyatt, P.C.

(57) ABSTRACT

A billet of veneer sheets is constructed using parallel sheet conveying conveyors for simultaneous building of partial fans that are combined and transferred to the trailing end of the billet. Encoders, detectors and computer controls control the conveyors for precise placement of the sheets in building a fan and precision placement of the fan to the trailing end of the billet.

6 Claims, 8 Drawing Sheets

50
52
48U
44U
48U
46U 50
54
58
56
46U
46L
54

PRODUCTION OF LAMINATED VENEER SUPPORT BEAMS

FIELD OF THE INVENTION

This invention relates to the production of laminated support beams and more particularly to a production process that enables the use (but not limited to the use) of a continuous pre-press operation wherein a continuous run of stacked sheets are bonded together and thereafter trimmed and sectioned into desired lengths and widths for use, e.g., as flanges for support beams.

BACKGROUND OF THE INVENTION

The process of producing laminate sheets involves first peeling a continuous strip of veneer (e.g., ⅛" thick) from a rotating log, segmenting the continuous strip into sheets (e.g., 100"×80"), and curing and stacking the sheets. The stacked sheets are then available for production of a desired laminate product which in the preferred embodiment herein disclosed is the production of flanges for structural support beams.

A primary consideration of the beam producing process is avoidance of junctures or seams which can produce a weakness in the completed flanges. Obviously, end abutting and gluing vertically aligned and stacked veneer sheets, the sheets being 100"×80" in dimensions, creates a juncture, e.g., every 100" that is not acceptable. Accordingly, the sheets within each stack are staggered. A first sheet is laid down, a second sheet is inset at one end, e.g., by 5½" and overlapped at the other end by the same 5½". A third, fourth and up to any desired number of sheets are laid down in the same way. A subsequent staggered stack of sheets produced in the same manner can then be slid into abutting relation, i.e., with each sheet abutting a corresponding sheet of the preceding stack. The junctures formed by the abutting sheets of overlying and underlying layers are spaced apart horizontally by 5½". (In practice, the ends are slightly overlapped to insure tight abutment, e.g., by 1" which compresses the length and the spacing between the junctures.) The numerous sheets, e.g., seventeen sheets of ⅛"×100"×80" in dimension, each being offset from its underlying sheet does not form a "stack "in the traditional sense and is hereafter referred to as a fan of veneer sheets. The procedure described is repeated to add fan after fan and thereby an endless billet of interfitted fans.

A process step not described and which is required for the desired bonding of the billet of interfitted fans is the step of pre pressing the stacked sheets. The assembled sheets of veneer (to which glue has been applied) are compressed in the pre-press operation to securely bond the sheets together (top to bottom and end to end). This bonding process was formerly done in segments (batch processing) to accommodate the interrupted assembly of the individual fans. It may be desirable that the assembled sheets and fans are pre-pressed in a continuous operation rather than the batch process as referred to. Accordingly, it is an objective to provide a process for assembling the sheets into fans and the fans into a billet that is more efficient than the prior processes and is considered beneficial to either a continuous feed or an intermittent feed of the billet through the pre-press operation.

BRIEF DESCRIPTION OF THE INVENTION

The preferred embodiment of the present invention includes parallel assembly lines that cooperatively generate the fans of veneer sheets and assembles the fans sequentially and end to end to form an elongate billet. The assembling of the fans is accomplished to precisely interfit the leading shingled end of each fan to the trailing shingled end of a preceding fan that has been previously joined to the billet, thereby repetitively adding to the billet which can be considered an endless operation. The billet is subjected to repetitive or continuous pre-press operation followed by the trimming and sectioning of the billet to form, e.g., the flanges of I-beams at whatever length may be desired. Other applications for the billet include laminated veneer lumber and header stock.

Improvements embodied by the preferred embodiment include a sheet alignment feature that assures a common alignment of the sheets when assembled into a fan. Also the relation of conveyors and other assembling mechanism which cooperatively form different portions of a fan and then interfit the portions into a completed fan which is then interfit with the trailing end of a billet.

The invention will be more fully understood and appreciated upon reference to the following detailed description having reference to the accompanying drawings.

DETAILED DESCRIPTION

The present invention is directed to the assembling of veneer sheets into billets which are multiple layers of veneer sheets, the sheets being glued, stacked and compressed together. The total thickness varies, e.g., in increments from 1 inch to 3 inch in thickness and as desired, the billets are sectioned into widths and lengths for forming the flanges of wooden I-beams.

Figure 1A:
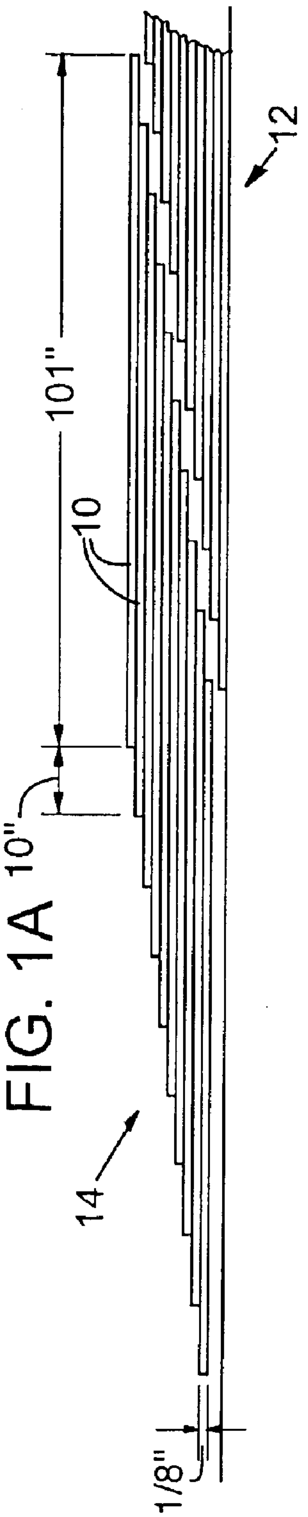
FIG. 1A illustrates a process in accordance with the invention whereby a fan is being assembled onto a billet.
Figure 1C:
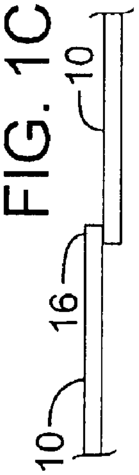
FIGS. 1C through 1F illustrate alternate methods for the joining of veneer sheet ends as when a fan is assembled onto a billet.
Figure 1D:
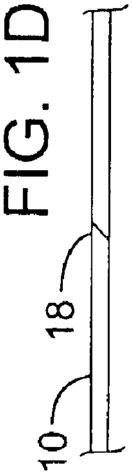
Figure 1E:
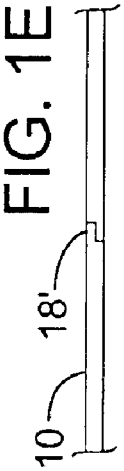
Figure 1F:
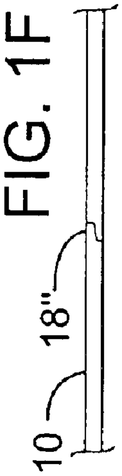
Figure 1B:
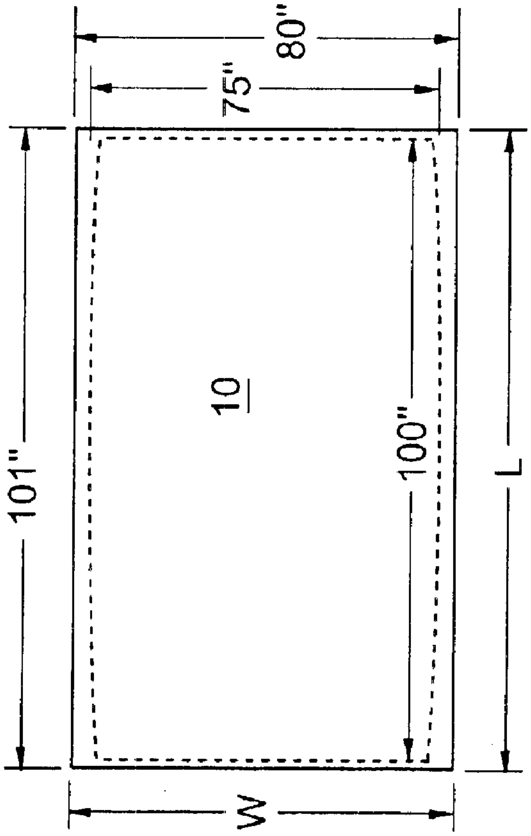
FIG. 1B illustrates a veneer sheet as used to produce the fans and billet, the sheet shown in a pre-cured state in solid lines and in a cured state in dash lines.

FIG. 1B represents a veneer sheet 10 such as used in the preferred embodiment of the invention. It will be instructive to know that such a sheet is produced from a continuous sheeting of veneer having a thickness of about ⅛ inch that has been peeled from a log of 100 plus inches in length and varying in diameter from, e.g., 24 inches and greater down to about 8 inches. (It will be appreciated that the veneer thickness may vary as known in the art. Such variation in thickness may initiate other changes and the reference to the ⅛-inch thickness is accordingly intended as an example only for use in explaining the invention.) As peeled, the sheeting is continuous until the log is reduced to a core of about 2 inches in diameter and the sheeting width comprises the 100 plus inches of the log length. The sheeting is trimmed and sectioned, e.g., into 80-inch long sections to form the sheet 10. Hereafter the sheet length will refer to the greater dimension, e.g., the 100 plus inches and the sheet width will refer to the smaller dimension, e.g., approximately 80 inches.

The ⅛-inch thick sheet being substantially rectangular when trimmed and sectioned is then cured by heating which induces shrinkage, the shrinkage being represented by the dash lines of FIG. 1B. It will be noted that the shrinkage is greater along the smaller dimension, i.e., the width W due to the grain direction. Further, that shrinking is greatest at the ends to produce a slightly bowed configuration along the sides (length L) of the sheet as shown.

Reference is now made to FIG. 1A which illustrates the end of a billet 12 and a fan 14 about to be joined to the billet 12. For ease of illustration, the billet 12 and fan 14 are made up of ten stacked sheets of veneer 10 to produce a billet having a thickness of 1¼ inches (⅛×10). Each sheet 10 of the fan (and billet) is staggered or offset so that the juncture between the topmost sheets is offset from the juncture of the underlying sheets and so on. The offset distance is desirably established so that the junctures are evenly distributed along the length of the billet, i.e., the bottommost juncture is the same distance lengthways from the trailing end of the topmost sheet as each juncture in the fan (or billet) is spaced from the preceding and succeeding junctures.

It will be appreciated from the discussion relating to FIG. 1B that the sheets 10 are not precisely the same dimensions and to accommodate slight variations (as well as some tolerance in the precision of the placement mechanism to be later discussed), the mated ends of sheets are overlapped, e.g., nominally a 1-inch overlap. FIG. 1C shows one form of such an overlap (reference 16) and it will be appreciated that the overlapped end portions are mashed together in the pre-press operation which follows assembly of the fan to the billet. (The overlapped ends nevertheless generate interstices that are believed to beneficially function as vents in the subsequent curing operation.) FIG. 1D shows an alternate form of overlap (reference 18) where the abutting ends are angled or scarfed. See U.S. Pat. No. 6,047,622. The resulting interfitting joint will be somewhat overlapped and mashed together but to a lesser extent than that of FIG. 1C. FIGS. 1E and 1F show examples of other interfitting end configurations indicated as 18' and 18".

Figure 2A:
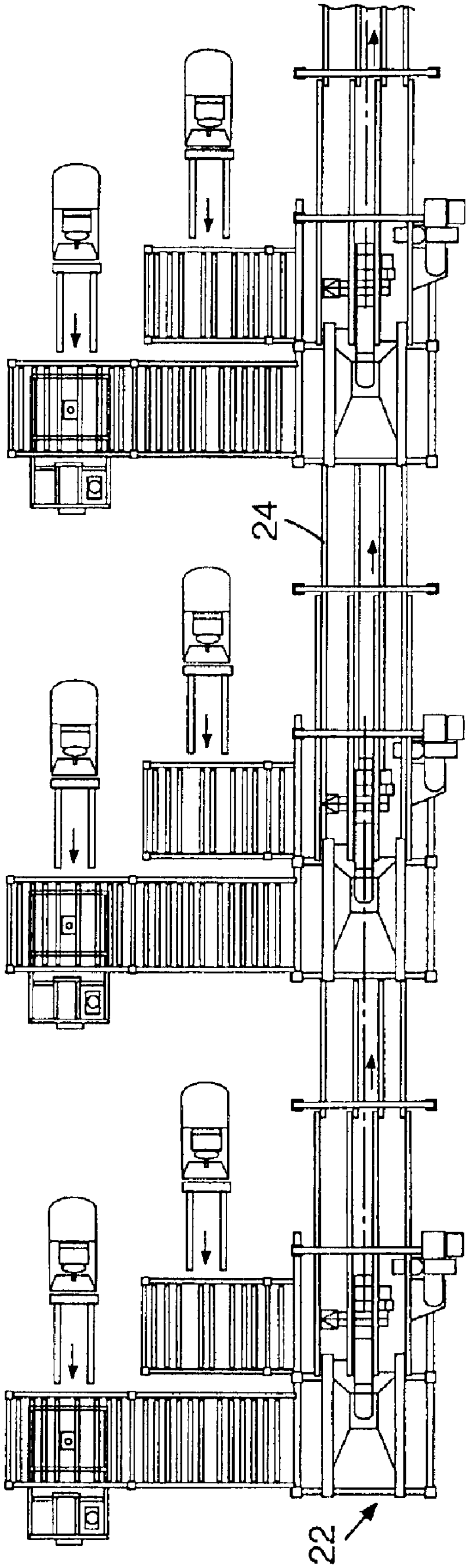
FIGS. 2AA and 2AB in combination illustrate in plan view the assembly operations for assembling veneer sheets into a fan in accordance with one embodiment of the invention.
Figure 2A:
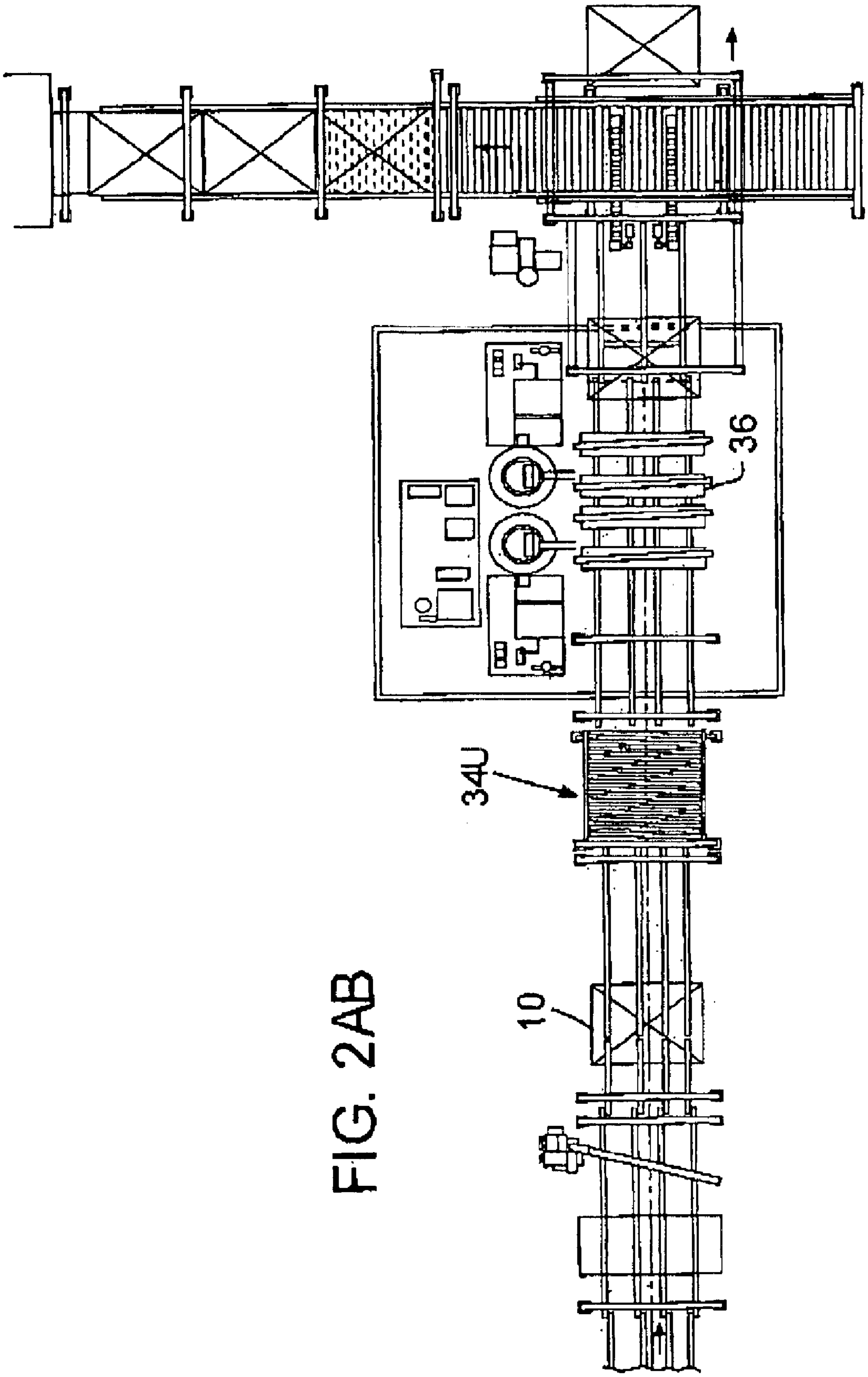
Figure 2B:
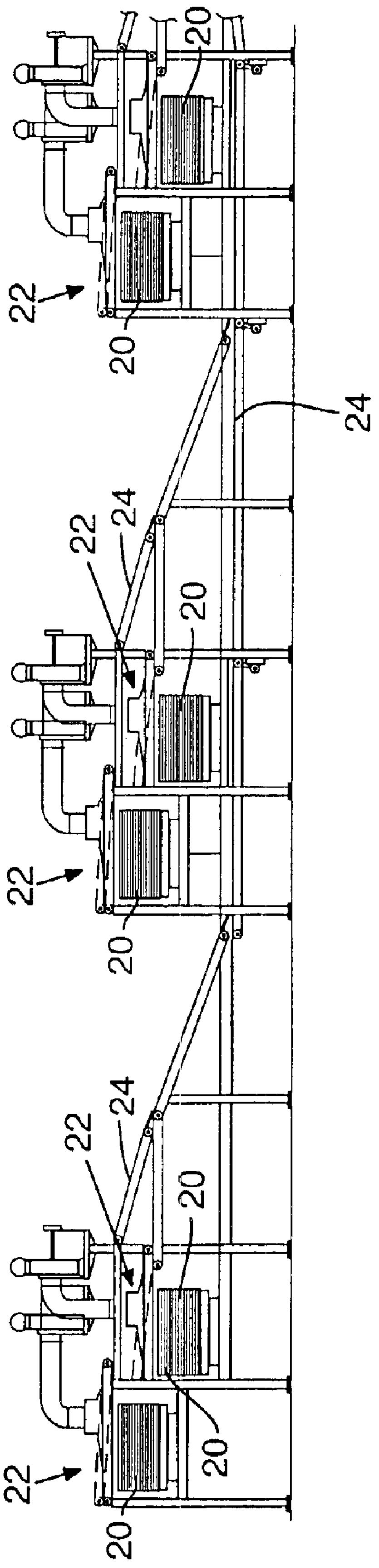
FIGS. 2BA and 2BB in combination illustrate in side view the assembly operations of FIGS. 2AA and 2AB.
Figure 2B:
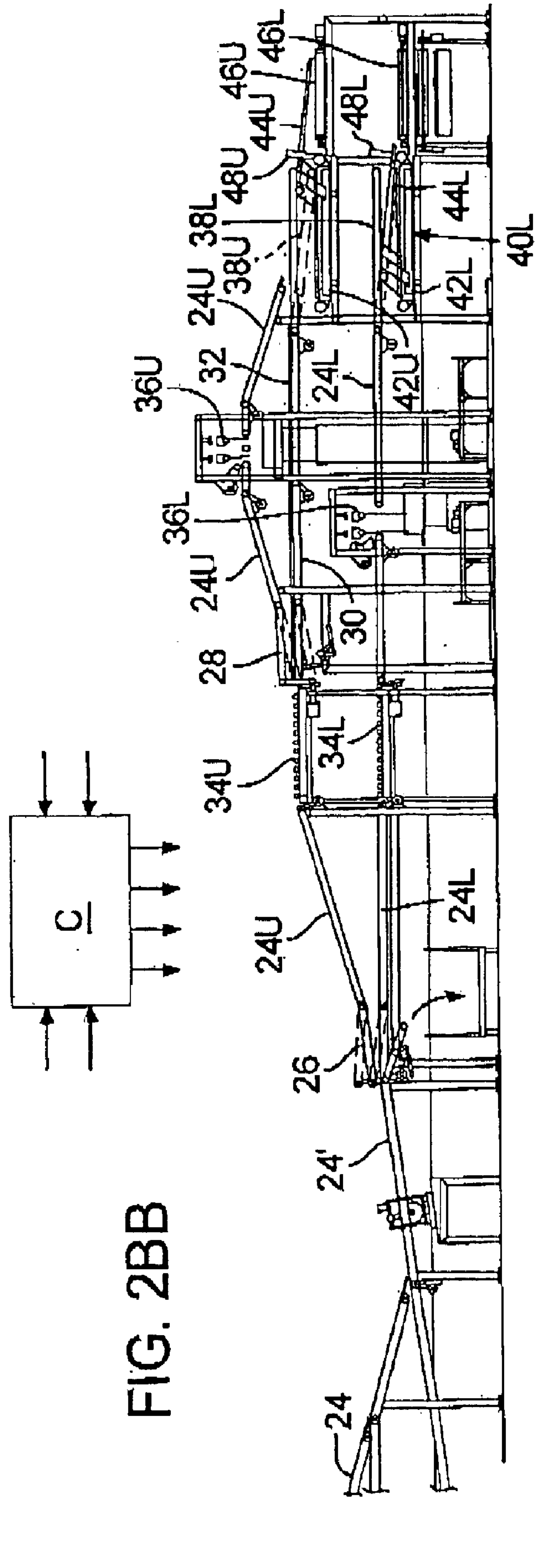

Reference is now made to the lay-up system in general which is illustrated in FIGS. 2AA, 2AB and 2BA, 2BB. Veneer sheets 10 (100 inches×75 inches) are selectively transferred by transfer devices 22 from stacks 20 to a primary conveyor 24 (consisting of multiple conveyor segments), the veneer sheets positioned in a controlled order onto the primary conveyor 24. The conveyor segments 24 cooperatively direct the sheets onto a common conveyor segment 24' in the desired order and then selectively directs the sheets (diverter 26 controlled by computer C) to upper and lower conveyors 24U and 24L as seen in FIG. 2BB. The sheets carried by the upper and lower conveyors 24U and 24L are directed onto evening rollers 34U and 34L which in a manner known to the art, forces one side edge of the sheets 10 against a side rail which aligns side edges of the sheets. The remainder of the system is illustrated in more detail in FIGS. 2AB, 2BB, 3A, 3B and 3C.

As particularly shown in FIGS. 2AB and 2BB, the upper conveyor 24U (following alignment by the evening rollers 34U) includes a second diverter 28 which diverts and directs the top sheets to be applied to the fan along a third conveyor path 30 to a holding station 32. The sheets 10 other than the top sheet are conveyed through upper and lower glue applicators 36U and 36L that applies a curtain of glue to the upper surface. (A pair of glue applicators are illustrated for each station to enable servicing of alternate ones of the applicators without interrupting the assembly process.)

Figure 2C:
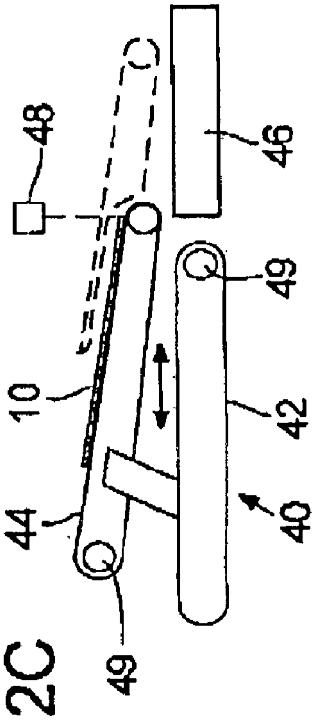
FIG. 2C is a schematic illustration of certain control components used in the assembly operation

Division of the assembly process into multiple paths enables the simultaneous building of multiple portions of the fan which are subsequently merged together to form a fully-completed fan as will be explained. Having reference first to the path of lower primary conveyor 24L illustrated in FIG. 2BB and specifically the portion thereof following the application of glue from applicator 36L, the veneer sheets 10 are conveyed onto a pivotal end portion 38L that pivots between the upper full line position and a lower dash line position. Underlying the conveyor portion 38L (in its upper full line position) is a complex conveyor 40L. (Refer also to the schematic illustration of the complex conveyor 40(L and U) in FIG. 2C) The complex conveyor 40L includes a base conveyor portion 42L which carries a placement conveyor portion 44L. This complex conveyor arrangement is repeated for the upper conveyor path indicated by reference nos. 40U, 42U and 44U.

In the illustration of the lower complex conveyor 40L, i.e., in the pathway of conveyor 24L, the placement conveyor 44L is in a retracted position and underlies the pivotal end portion 38L of conveyor 24L. In the illustration of the upper complex conveyor 40U, the placement conveyor 44U is in the extended position whereat the placement conveyor 44U overlies a cross conveyor 46U, the function of which will be explained hereafter. To initiate forward positioning of the sheets 10 for delivery to the cross conveyor 46L, the end portion 38L (on which a sheet 10 resides) is pivoted to its lowered position (shown in dash lines) with the placement conveyor portion 44L retracted by base conveyor portion 42L as shown. The angled placement conveyor 44L is then moved laterally toward cross conveyor 46L by base conveyor portion 42L. The sheet 10 located on the end portion 38 is picked or lifted off the conveyor portion 38L by the placement conveyor 44L and moved into position over the cross conveyor 46L. During such movement, the leading edge of the sheet 10 is detected by detectors 48L whereby the position of the leading edge is known to the computer and continuously tracked, e.g., via encoders (illustrated as item 49 in FIG. 2C whereby rotation of the end roller is "observed" by the computer). When the leading edge of sheet 10 is positioned at the desired position over the cross conveyor 46L, i.e, in line with the outer side edge of the billet, the base conveyor 42L is retracted and the conveyor of placement conveyor 44L is activated to feed the sheet 10 off of the placement conveyor and onto the cross conveyor 46L in the precise position dictated by the computer. This is accomplished at least in part by matching the speed of the conveyor 44L to the retraction generated by rearward movement, e.g., of the conveyor belts of base conveyor 42L. (Again refer also to FIG. 2C)

The movement of the sheets along the upper path, i.e., conveyor 24U include similar positioning apparatus. The upper primary conveyor 24U as continued after the glue applicators 36U directs the veneer sheets 10 onto a pivotal portion 38U and with placement conveyor 44U in its retracted position (controlled by base conveyor 42U) the placement conveyor in the same manner removes the sheet 10 from the downwardly pivoted conveyor 38U, moves the sheet past detectors 48U to the precise position over cross conveyor 46U as dictated by the computer C. The base conveyor 42U is retracted and conveyor 44U is activated to offload the sheet 10 onto the upper cross conveyor 46U.

Figures 3A, 3C:
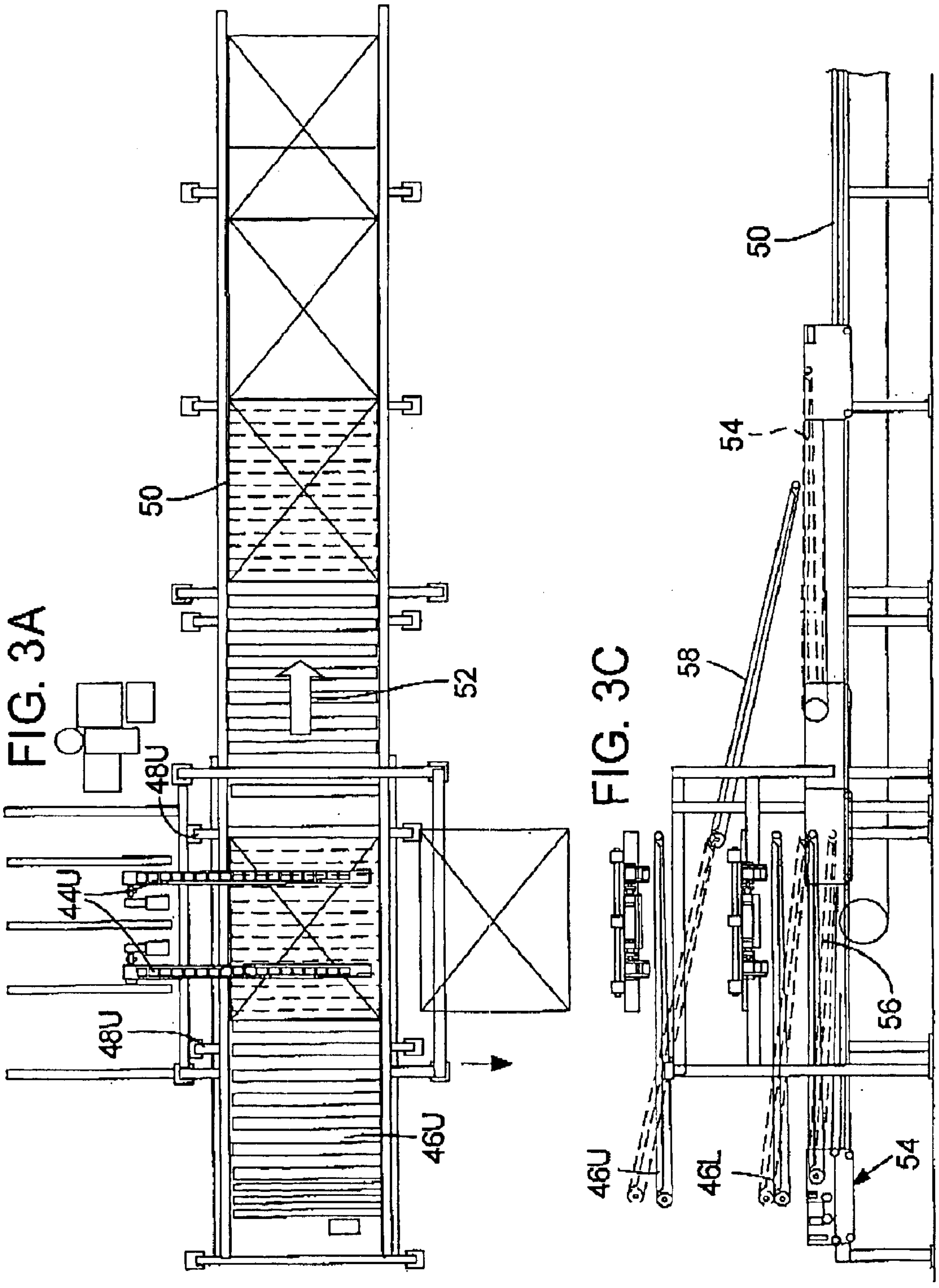
FIGS. 3A, 3B and 3C are enlarged plan, side and front views respectively of the assembly operations whereat the veneer sheets are assembled into upper and lower fan portions, the fan portions assembled into a fan and then assembled onto a billet in accordance with the invention.
Figure 3B:
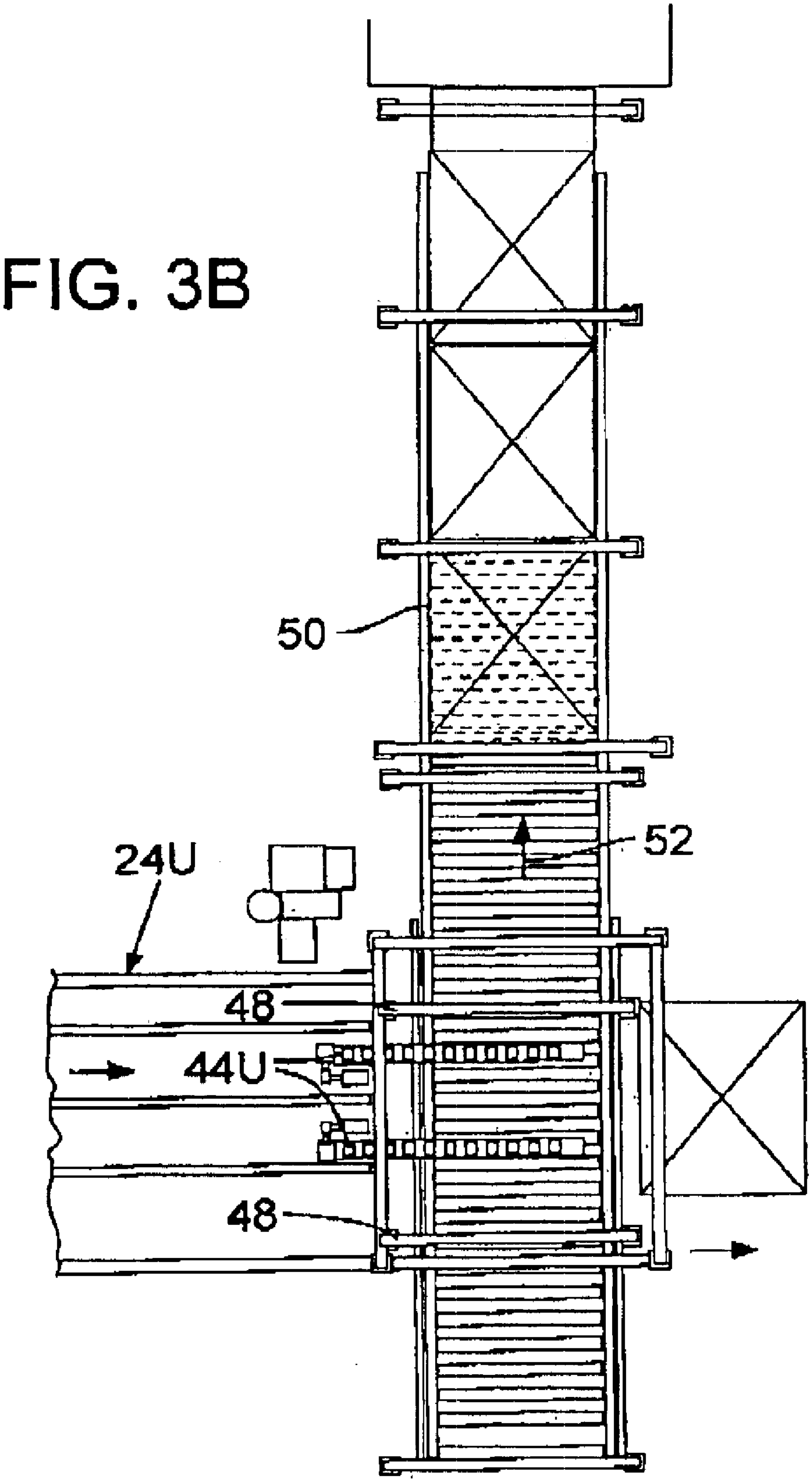

Certain of the features of the placement conveyors 44 are of particular interest and reference is first made to the placement conveyor 44U as particularly illustrated in FIG. 3A. This conveyor is provided as parallel and spaced apart conveyor belts which are provided with negative air pressure that suctions the sheets 10 onto the belts and insures precise control over the sheets. As previously discussed, this conveyor conveys the veneer sheets through detectors 48U. Whereas two detectors are shown, there may be additional detectors spaced along the front edge of the sheet. As the sheet passes through the detectors, the leading edge at least at two positions is detected by detectors 48U. Such detection establishes the location and skew orientation of the sheet. The suction belts of placement conveyor 44U are capable of independent operation, and as such, the conveyor 44U is able to reorient the sheets as dictated by the computer. See commonly owned U.S. Pat. No. 4,905,843 which teaches such skew orientation.

A difference between the upper and lower sheet placement operations involves the top sheet which is at holding station 32. As noted, this sheet does not receive glue and is selected to have a desired quality. As determined by the computer, when the fan portion except the top sheet is conveyed off of pivotal end portion 38U, conveyor 30 is activated to direct the top sheet onto the pivotal end portion 38U and then onto the cross conveyor 46U in the manner described. The operations of the cross conveyor 46L and 46U will now be described with reference to FIGS. 3A and 3C. Again, the upper and lower conveyor systems are similar in operation but with some differences that will be explained.

The cross conveyor 46U is also controlled by computer C. As each of the sheets 10 are laid onto the cross conveyor and following the placement of each sheet, the cross conveyor is indexed rearwardly (relative to the movement of the billet conveyor 50 indicated by arrow 52). The sheets are thereby staggered or fanned so as to create junctures when added to the billet that are equally spaced along the length of the billet and this spacing is determined by the length of sheets 10 and the number of sheets that form the fan. FIG. 1 illustrates ten sheets having a length of 101 inches, which due to the 1-inch overlap illustrated in FIG. 1C has a resultant length of 100 inches. The offset for such a stack to achieve the equal spacing is ten inches as illustrated for FIG. 1. A more common fan would have seventeen sheets and a nominal length of 98 inches (after shrinkage), resulting in about a 5¾ inch offset.

It will also be explained at this point that with the use of multiple detectors 48 positioned along the then leading edge of sheet 10, the computer can detect edge defects and slight length variations. The computer can be programmed accordingly to instruct the placement conveyor and/or the cross conveyor to make desired adjustments in the placement of the sheet in either lateral direction front to back or side to side (complimentary) in relation to the direction indicated for arrow 52. In any event, the intermittent rearward movement of the cross conveyor provides for the staggered placement of the sheets one over the other as illustrated in FIG. 1A.

It is considered desirable to create a fifty-fifty split between the cross conveyors whereby half of the sheets are fan stacked on the upper cross conveyor 46U and half on the lower cross conveyor 46L, with the top sheet applied as the top sheet on the upper conveyor (which in a seventeen sheet fan would result in a partial fan of eight sheets on the lower cross conveyor 46L, and nine sheets on the top conveyor cross conveyor 46U).

With completion of the partial fans, the remaining steps are to combine the partial fans into a completed fan and then join the completed fan onto the trailing end of the billet 12 (shown in FIG. 1). This is accomplished via the operation of a transfer mechanism including a shuttle 54 and delivery conveyor 56. Shuttle 54 is movable along the path of the billet conveyor (arrow 52) and carries the delivery conveyor 56. Shuttle 54 is computer controlled for moving the delivery conveyor 56 substantially from a position under cross conveyor 46L and along the length of the billet conveyor 50.

The delivery conveyor tilts up and down as indicated by the alternate full and dash line positions and the combination of shuttle 54 and conveyor 56 operate in a manner similar to that of complex conveyor 40. With the delivery conveyor 56 in the retracted position under cross conveyor 46L, cross conveyor 46L tilts down and the conveyor of 46L is operated in synch with the forward movement of shuttle 54 to lay the bottom portion of the fan onto the delivery conveyor 56 (the conveyor 56 being moved by shuttle 54 but with the conveyor belt of conveyor 56 idle). The position of the lower partial fan now residing on conveyor 56 is known by the computer and the upper partial fan is delivered from the tilted upper cross conveyor 46U and onto an extension conveyor 58. The extension conveyor 58, also computer controlled, delivers the upper partial fan to precisely match with the lower partial fan as moved along the path 52 by shuttle 54 and produces the completed fan that is now carried by the delivery conveyor 56 and shuttle 54 toward the billet.

Again it is emphasized that the position of the fan carried by the shuttle 54 and the position of the trailing end of the billet 12 are continuously known to the computer and upon the precise positioning of the fan with the billet end, the conveyor belt of conveyor 56 is activated as the shuttle retracts (the operation of shuttle 54 and conveyor 56 keeping pace with the billet whether moving or not) to lay the sheets of the fan in the overlapping relation with the billet sheet ends as explained with reference to FIGS. 1A, 1C and 1B.

It will be appreciated that the system described includes a plurality of encoders used for enabling the computer to control the various material movers and which enables the computer to dictate with precision, a) the desired placement of the sheets to produce the partial fans, b) the partial fans being combined to form a completed fan, and c) the placement of the fan at the tail end of the billet, the process being ongoing and repetitive to effectively generate an endless billet 12 for whatever following process is to be encountered by the billet.

Figure 4:
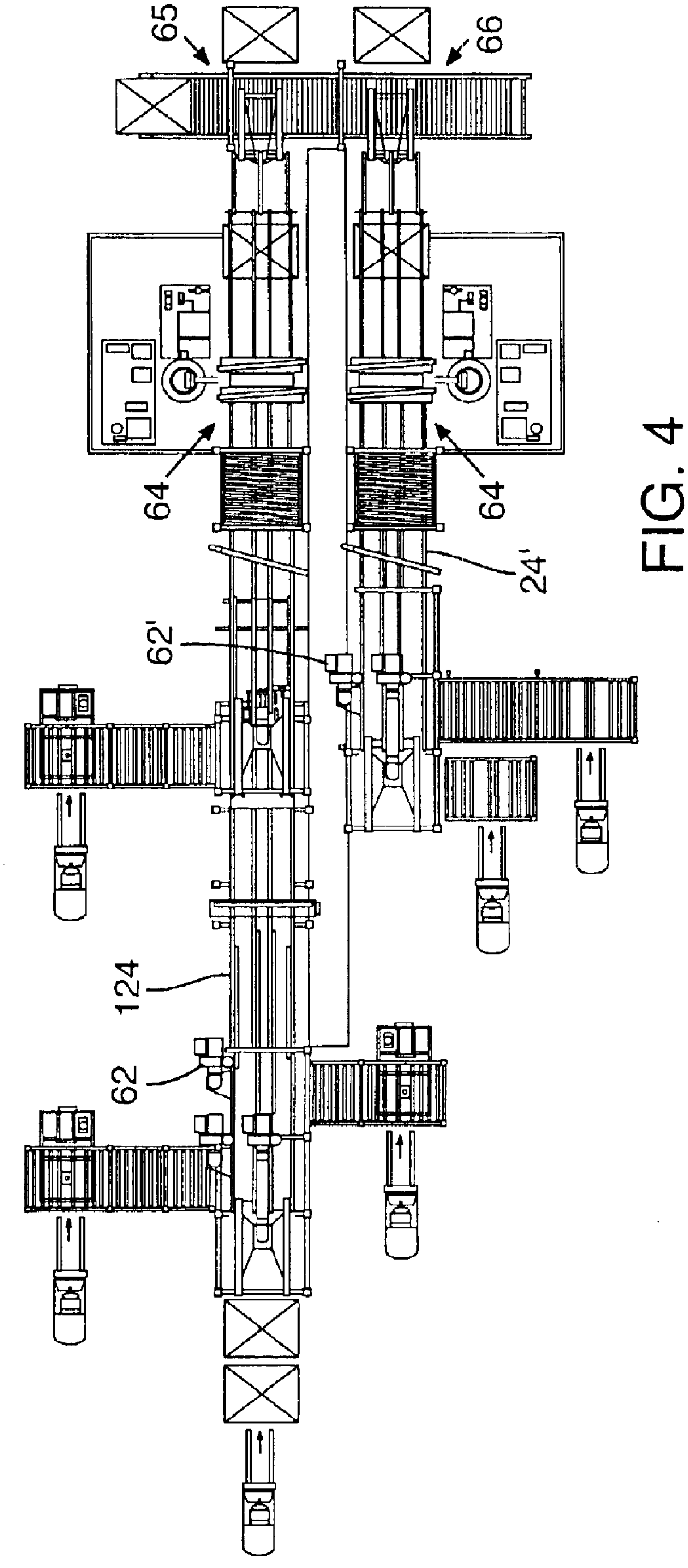
FIG. 4 illustrates an alternate embodiment of the invention.

Whereas the above discloses parallel conveyor systems that are preferably vertically displaced, similar precision and efficiency benefits can be achieved with parallel side-by-side conveyors. Such an alternate system is illustrated in the general layout illustration of FIG. 4. In general, the assembly incorporates parallel conveyors 124 and 124' that selectively receive veneer sheets as in the preferred embodiment and as the sheets are conveyed along the conveyors 124 and 124' they are passed through glue applicators 64 where glue is applied to the upper surface, and then fed to the positioning conveyors.

It will here be assumed that there will be seventeen veneer sheets making up the beam thickness. Of the seventeen sheets, it will be assumed that twelve of the sheets are assembled in staggered relation by primary conveyor 124 on a first cross conveyor 64 and then transported to a second cross conveyor 66 whereat the remaining five sheets are added to the fan from the second primary conveyor 124'. The second cross conveyor transfers the fan to a shuttle again in the manner of the preferred embodiment which transfers the completed fan to the end of the billet.

An important aspect of this invention is the provision of multiple pathways for the sheets and the building of a fan in multiple stages. Included is the utilization of multiple detectors and computer control of the multiple stages to achieve precision that results in less waste and less time and which enables, but without requiring, the continuous building of an endless billet for uninterrupted pre-press operation. Numerous variations of the many steps incorporated into the system will be readily conceived by those skilled in the art. The invention is accordingly not limited to the systems disclosed, but instead encompasses the many alternative embodiments suggested by these disclosures and which are encompassed by the scope of the claims appended hereto.

The invention claimed is:

1. A system for producing a billet of end-to-end connected fans which comprises:

at least a pair of primary conveyors sequentially feeding veneer sheets along parallel pathways to a corresponding respective pair of placement conveyors;

a corresponding pair of cross conveyors receiving the sheets from the respective pairs of placement conveyors, said placement conveyors and cross conveyors cooperatively operated for building partial fans on the cross conveyors;

a billet conveyor conveying a billet of interconnected fans along a direction of billet conveyance, said billet having a defined trailing end;

a transfer mechanism sequentially and cooperatively receiving the partial fans and combining the partial fans into a completed fan;

said transfer mechanism further conveying the completed fan along the direction of the billet conveyance and placing the completed fan at the trailing end of the billet to extend the billet and thereby define a new trailing end; and detectors and encoders, and a computer responsive to the detectors and encoders which controls the movement of the placement conveyors, cross conveyors and transfer mechanism for cooperative and precision assembly of the sheets into the completed fan, and then assembly of the fan onto the trailing end of the billet.

2. A system as defined in claim 1 including detectors placed in the path of the sheets as the sheets are conveyed by the placement conveyors to the cross conveyors, said placement conveyors and cross conveyors moveable in complementary lateral directions and cooperatively controlled in said lateral directions for placement of the sheets in staggered and aligned relation onto the cross conveyor.

3. A system as defined in claim 2 wherein the placement conveyors include a pair of conveyor belts, a negative air pressure source connected to the pair of conveyor belts and suctioning the sheets onto the conveyor belts, and an independent conveyor control provided to each of the conveyor belts for selective operation of the conveyor belts as dictated by the computer for skew alignment of the sheets.

4. A system as defined in claim 1 wherein the parallel pathways defined by the primary conveyors, placement conveyors, and cross conveyors are vertically spaced to define upper and lower parallel pathways, and wherein the transfer mechanism receives a first partial fan from the lower cross conveyor and positions the first partial fan to receive a second partial fan from the upper cross conveyor for assembly into the completed fan.

5. A system as defined in claim 4 wherein the transfer mechanism includes a shuttle carrying a delivery conveyor between receiving positions and then to the billet trailing end, the shuttle being retracted as the delivery conveyor advances the fan forwardly off the delivery conveyor and into position relative to the billet end billet for forming a new billet trailing end.

6. A system as defined in claim 1 wherein the parallel pathways including the primary conveyors and placement conveyors are laterally spaced apart and the transfer mechanism includes cooperative operation of the cross conveyors to transfer a first partial fan from the first cross conveyor to the second cross conveyor, the second partial fan thereafter produced by adding sheets to the first partial fan.

* * * * *